US012106642B2

(12) United States Patent
Abdallah

(10) Patent No.: US 12,106,642 B2
(45) Date of Patent: Oct. 1, 2024

(54) METHODS AND SYSTEMS FOR MONITORING AND REPORTING SECURITY BREACH OF A PROPERTY

(71) Applicant: Youssef Abdallah, London (CA)

(72) Inventor: Youssef Abdallah, London (CA)

(73) Assignee: Youssef Abdallah, London (CA)

( * ) Notice: Subject to any disclaimer, the term of this patent is extended or adjusted under 35 U.S.C. 154(b) by 104 days.

(21) Appl. No.: 18/084,712

(22) Filed: Dec. 20, 2022

(65) Prior Publication Data

US 2023/0230463 A1 Jul. 20, 2023

(51) Int. Cl.
*G08B 13/183* (2006.01)
*G08B 13/196* (2006.01)

(52) U.S. Cl.
CPC ..... *G08B 13/183* (2013.01); *G08B 13/19602* (2013.01)

(58) Field of Classification Search
CPC .... G08B 13/10; G08B 13/181; G08B 13/187; G08B 13/19; G08B 13/19602; G08B 13/1961; G08B 13/19697; G08B 13/2491
See application file for complete search history.

(56) References Cited

U.S. PATENT DOCUMENTS 6,317,040 B1 * 11/2001 Ikeda ..................... G08B 29/18 340/552
11,789,136 B2 * 10/2023 Mazur ..................... G01S 13/87 342/27
2012/0038456 A1 * 2/2012 Pikkarainen ......... G08B 13/183 340/5.61
2012/0169487 A1 * 7/2012 Poder ..................... G08B 25/10 340/426.15
2013/0113625 A1 * 5/2013 Libby ................ G08B 13/2491 340/541
2015/0341599 A1 * 11/2015 Carey .................... H04N 7/181 348/150
2018/0176512 A1 * 6/2018 Siminoff ................ H04N 7/188

FOREIGN PATENT DOCUMENTS

EP 2698773 A1 * 2/2014 ....... G08B 13/19697
GB 2589087 A * 5/2021 ............. G08B 13/00
KR 20200094953 A * 11/2019 ......... G08B 21/0415

* cited by examiner

*Primary Examiner* — Andrew W Bee

(57) ABSTRACT

Present disclosure describes techniques for monitoring and reporting a security breach of a property. The techniques according to the present disclosure comprise detecting at least one activity by at least one motion sensor of a plurality of motion sensors, monitoring a time period of the at least one activity and determining whether the time period of the at least one activity surpasses a predetermined time period, and if the time period of the at least one activity surpasses the predetermined time period, activating a plurality of laser curtains placed on the property, and transmitting an alert to an owner of the property. The techniques further disclose determining whether at least one laser curtain of the plurality of laser curtains is disrupted, and if the at least one laser curtain of the plurality of laser curtains is disrupted, generating an audio-visual alert to notify about the security breach to one or more people present inside and outside of the property. Accordingly, the techniques of the present disclosure facilitate minimization of false alarms and unwanted alerts.

19 Claims, 7 Drawing Sheets

500

METHODS AND SYSTEMS FOR MONITORING AND REPORTING SECURITY BREACH OF A PROPERTY

TECHNICAL FIELD

The present disclosure in general relates to security systems. More particularly, but not exclusively, to techniques for monitoring and reporting security breach of a property and preventing false alarms.

BACKGROUND

Security systems are primarily installed in different types of properties to protect the premises within a perimeter. Often, these systems make use of barrier alarm devices, such as door and window sensors, motion detectors, sound detectors, etc. The sensors in the windows and doors are connected to main power supply and siren unit. The alarms use electric circuits. If someone attempts to open or break the doors or windows, their electrical supply is stopped and the alarm starts to beep in high decibel.

Motion detectors are used as security systems for monitoring any intruder activity. The prevailing motion detectors can sense the persons who are in close proximity to the detector. The main element in the motion detector circuit is the dual infrared reflective sensor or any other detecting sensor.

However, these motion detectors tend to detect motion of pets and animal in the perimeter of the property and generate false alarm. Often occupants forget that the security system is armed, and when they open a door or a window, a false alarm is triggered. Unfortunately, many false alarms are generated due to technological or human error. The property owner is usually responsible for costs incurred by police or security personnel who are sent to respond to a false alarm. Also, a great number of false alarms also results in slower response time during a true event or emergency due to less available security personnel or a perceived lack of urgency.

Thus, there exists a need in the art to provide a technique which overcomes the above-mentioned problems by preventing false alarms while still maintaining the integrity and functionality of the security system.

The information disclosed in this background section is only for enhancement of understanding of the general background as identified in the disclosure and should not be taken as an acknowledgement or any form of suggestion that this information forms the prior art already known to a person skilled in the art.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method of monitoring and reporting a security breach of a property is disclosed. The method comprises detecting at least one activity by at least one motion sensor of a plurality of motion sensors, the plurality of motion sensors being placed outside the property. The method further describes the step of monitoring a time period of the at least one activity and determining whether the time period of the at least one activity surpasses a predetermined time period. If the time period of the at least one activity surpasses the predetermined time period, activating a plurality of laser curtains placed on the property, and transmitting an alert to an owner of the property. The method further describes the step of determining whether at least one laser curtain of the plurality of laser curtains is disrupted, and if the at least one laser curtain of the plurality of laser curtains is disrupted, generating an audio-visual alert to notify about the security breach to one or more people present inside and outside of the property.

In another non-limiting embodiment of the present disclosure, the audio-visual alert comprises an audio alarm and a continuous flash of light.

In yet another non-limiting embodiment of the present disclosure, the detecting the at least one activity comprises detecting a lurking activity, a skulking activity, or a loitering activity outside the property by the at least one motion sensor.

In yet another non-limiting embodiment of the present disclosure, the plurality of motion sensors includes at least one pet immune motion sensor, and the at least one pet immune motion sensor detects the at least one activity of an entity having a predetermined weight.

In yet another non-limiting embodiment of the present disclosure, each laser curtain comprises a plurality of laser units for emitting a plurality of laser beams.

In yet another non-limiting embodiment of the present disclosure, determining whether the at least one laser curtain of the plurality of laser curtains is disrupted comprises monitoring a height measured by each of the plurality of laser units, detecting a change of height by comparing the height measured by each of the plurality of laser units with a respective initial height measurement, and determining a disruption of the at least one laser curtain if the change of height is detected.

In yet another non-limiting embodiment of the present disclosure, transmitting the alert to the owner of the property comprises providing a live streaming of plurality of cameras placed around the property.

In yet another non-limiting embodiment of the present disclosure, the alert includes a text message or an application notification on a device of the owner. The method further comprises displaying the alert via a display unit, the alert comprises a notification indicating that the barrier around the property has been penetrated, and the display unit is used for turning ON/OFF the security system.

In yet another non-limiting embodiment of the present disclosure, a system for monitoring and reporting a security breach of a property is disclosed. The system comprises a plurality of cameras, a plurality of laser curtains, and at least two alert generation unit. Each alert generation unit includes an audio generation unit and a light emission unit, and at least one alert generation unit is placed inside the property and at least one alert generation unit is placed outside the property. The system further comprises a plurality of motion sensors placed outside the property and configured to detect at least one activity using at least one motion sensor of the plurality of motion sensors, a memory comprising one or more instruction, and a processing unit in communication with the plurality of cameras, the plurality of laser curtains, the at least two alert generation unit, the plurality of motion sensors, and memory. The processing unit is configured to monitor a time period of the at least one activity and determine whether the time period of the at least one activity surpasses a predetermined time period. If the time period of the at least one activity surpasses the predetermined time period, the processing unit is configured to activate the plurality of laser curtains placed on the property, and transmit an alert to an owner of the property. The processing unit is then configured to determine whether at least one laser curtain of the plurality of laser curtains is disrupted and generate an audio-visual alert to notify about the security breach to one or more people present inside and outside of the property, if at least one laser curtain of the plurality of laser curtains is disrupted.

In yet another non-limiting embodiment of the present disclosure, to generate the audio-visual alert, the processing unit is configured to generate, via the at least two alert generation unit, an audio alarm and emit, via the at least two alert generation unit, a continuous flash of light.

In yet another non-limiting embodiment of the present disclosure, each laser curtain comprises a plurality of laser units configured to emit a plurality of laser beams.

In yet another non-limiting embodiment of the present disclosure, to determine whether the at least one laser curtain of the plurality of laser curtains is disrupted, the processing unit is configured to monitor a height measured by each of the plurality of laser units, detect a change of height by comparing the height measured by each of the plurality of laser units with a respective initial height measurement, and determine a disruption of the at least one laser curtain if the change of height is detected.

In yet another non-limiting embodiment of the present disclosure, to transmit the alert to the owner of the property, the processing unit is configured to provide a live streaming of the plurality of cameras placed around the property. The processing unit is configured to store the live streaming of the plurality of cameras in the memory.

In yet another non-limiting embodiment of the present disclosure, to transmit the alert, the processing unit is configured to transmit a text message or an application notification on a device of the owner. The system further comprises a display unit in communication with the processing unit and configured to display the alert on a screen of the display unit, the alert comprising a notification indicating that the barrier around the property has been penetrated, and turn ON/OFF the security system.

In yet another non-limiting embodiment of the present disclosure, the plurality of laser curtains comprises a circular rod structure for accommodating the plurality of laser units.

In yet another non-limiting embodiment of the present disclosure, a non-transitory computer readable medium having computer-readable instructions that when executed by a processor causes the processor to perform operations of detecting at least one activity by at least one motion sensor of a plurality of motion sensors, the plurality of motion sensors being placed outside the property, monitoring a time period of the at least one activity and determining whether the time period of the at least one activity surpasses a predetermined time period. If the time period of the at least one activity surpasses the predetermined time period, activating a plurality of laser curtains placed on the property, and transmitting an alert to an owner of the property. The non-transitory computer readable medium having computer-readable instructions that when executed by the processor causes the processor to further perform operations of determining whether at least one laser curtain of the plurality of laser curtains is disrupted, and if the at least one laser curtain of the plurality of laser curtains is disrupted, generating an audio-visual alert to notify about the security breach to one or more people present inside and outside of the property.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying Figures, in which:

FIG. 3(*b*) illustrates an exemplary implementation of a laser curtain on an entrance door of a house, in accordance with some embodiments of the present disclosure;

FIG. 4(*b*) illustrates an exemplary laser curtain rod, in accordance with some embodiments of the present disclosure;

Figure 1:
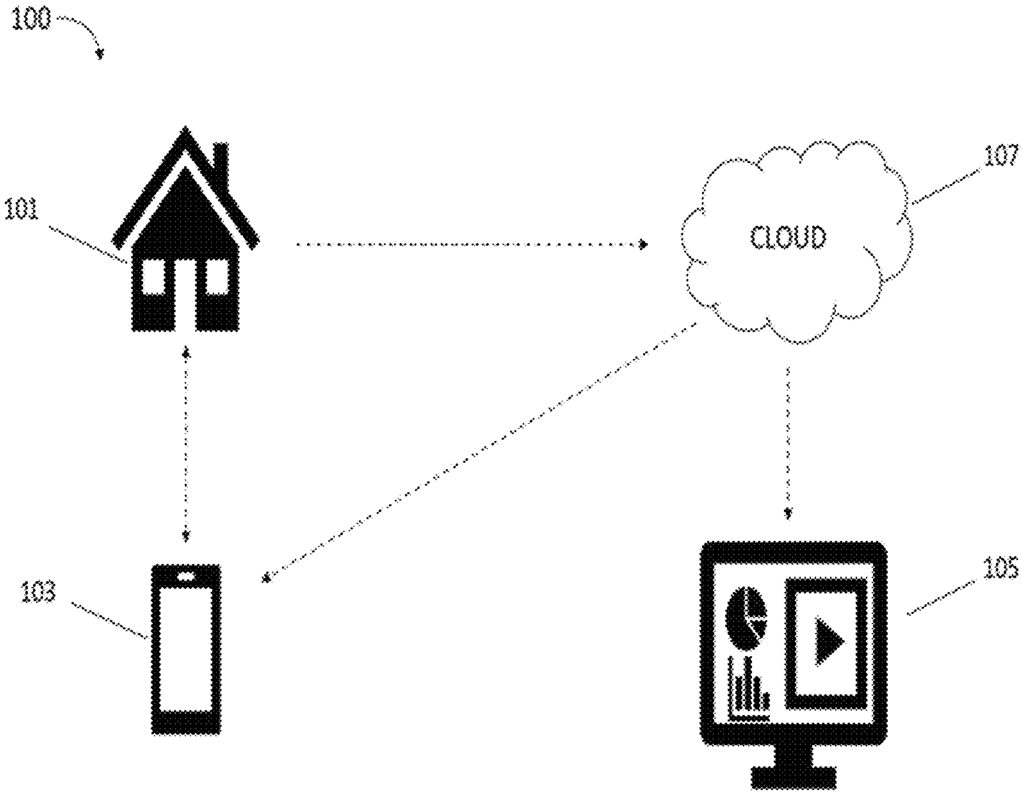
FIG. 1 shows an exemplary environment for monitoring and reporting a security breach of a property, in accordance with some embodiments of the present disclosure.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that these embodiments are not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

In an embodiment of the present disclosure, techniques for monitoring and reporting a security breach of a property is disclosed. The techniques according to the present disclosure comprise detecting at least one activity by at least one motion sensor of a plurality of motion sensors, monitoring a time period of the at least one activity and determining whether the time period of the at least one activity surpasses a predetermined time period, and if the time period of the at least one activity surpasses the predetermined time period, activating a plurality of laser curtains placed on the property, and transmitting an alert to an owner of the property. The techniques further disclose determining whether at least one laser curtain of the plurality of laser curtains is disrupted, and if the at least one laser curtain of the plurality of laser curtains is disrupted, generating an audio-visual alert to notify about the security breach to one or more people present inside and outside of the property. Accordingly, the techniques of the present disclosure facilitate minimization of false alarms and unwanted alerts.

FIG. 1 shows an exemplary environment 100 for monitoring and reporting a security breach of a property, in accordance with some embodiments of the present disclosure.

In an embodiment of the present disclosure, the environment 100 may comprise a property 101, a user device 103, a monitor and control unit 105, and a cloud 107 in communication with each other. The property 101 may be a house, an apartment, or a building. The property 100 may have a security system installed for monitoring and reporting the security breach.

The security system may comprise motion detectors, cameras, several laser curtains, and audio-visual alert generators. The security system installed on the property 101 may be configured to provide real time notifications or alerts to the user device 103. The alerts may indicate the barrier present around the boundary of the property 101 has been penetrated. The alert may be conveyed to an owner or a user via text message or application notification.

In one non-limiting embodiment of the present disclosure, in response to detection of the barrier penetration, the security system may start transmitting the live streaming of cameras located around the property to a cloud 107. The cloud 107 may be configured to store the live streaming of the cameras. The cloud 107 may also be configured to share the live streaming of cameras on an application installed on the user device 103. In one non-limiting embodiment of the present disclosure, the security system may transmit the live streaming of cameras directly to the user device 103. The user device 103 may comprise a mobile phone, tablet computer, desktop computer, laptop, or any other computing device known to a person skilled in the art.

In an embodiment of the present disclosure, the monitor and control unit 105 may be present at the door of the property 101. The monitor and control unit 105 may comprise a display for displaying live video recording of all the cameras placed around the property 101. The monitor and control unit 105 may be configured to arm and disarm the security system installed on the property 101. The owner may use the monitor and control unit 105 to disarm the security system for avoiding false alarm.

In one non-limiting embodiment of the present disclosure, the owner may verify the authenticity of the alert using the live streaming of the cameras located on the property. The owner may directly turn ON/OFF the installed security system using the user device 103 for avoiding the false alarm and unwanted alert.

In an embodiment of the present disclosure, if any one of the laser curtains is disturbed, the security system may generate an audio-visual alert through the audio-visual alert generators, which are situated both inside and outside of the property. Thus, the security system may provide loud audio alert and emit continuous flash of light to alert the property owner or anyone around the property of the intruder at once.

In one non-limiting embodiment of the present disclosure, the security system may also transmit an alert to police or security personnel along with the audio-visual alert. The alert may comprise live streaming of cameras installed on the property. Thus, the security system assists the police or security personnel in case of a security breach.

Figure 2:
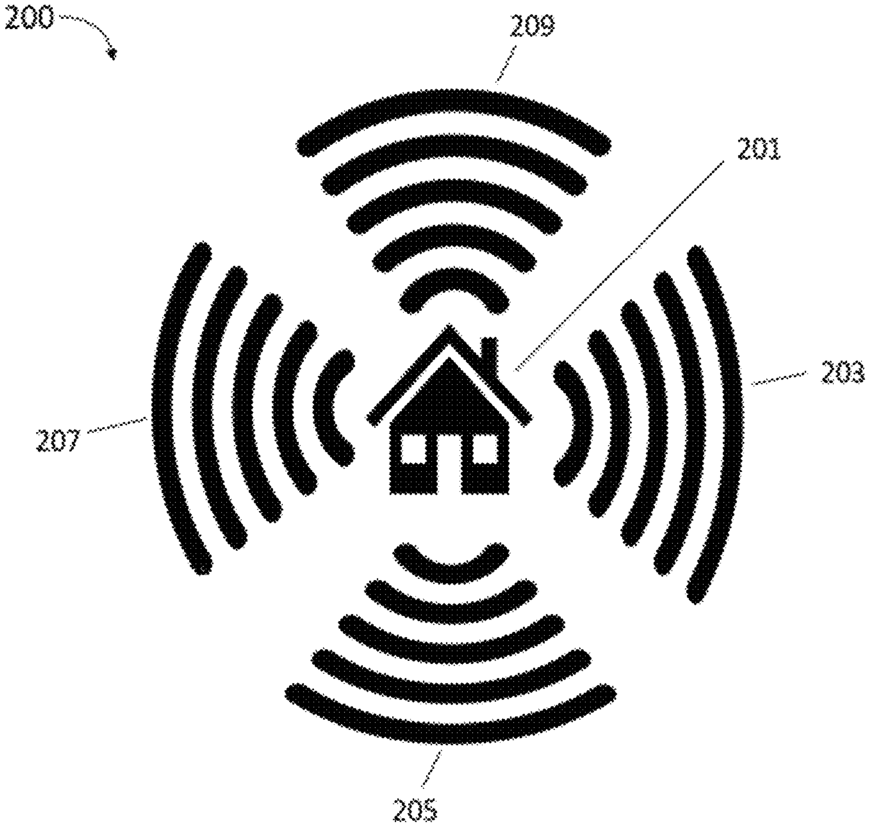
FIG. 2 illustrates an exemplary environment for detecting any perimeter security breach of a property, in accordance with some embodiments of the present disclosure.

FIG. 2 illustrates an exemplary environment 200 for detecting any perimeter security breach of a property, in accordance with some embodiments of the present disclosure.

In an embodiment on the present disclosure, the environment 200 may comprise a property 201 to be monitored for security breach. The environment 200 may further comprise a plurality of motion sensors 203, 205, 207, and 209 present all around the property 201. The motion sensors 203, 205, 207, and 209 are placed such that it covers the entire perimeter of the property 201. The motion sensors 203, 205, 207, and 209 may be configured to detect and monitor any lurking activity, skulking activity, or loitering activity outside the property.

In one non-limiting embodiment of the present disclosure, the motion sensors 203, 205, 207, and 209 installed on the property may be pet immune motion sensors capable of detecting lurking activities of an entity having a predetermined weight. The predetermined weight may be greater than 45 kg. The pet immune motion sensors eliminate the chances of false alarm, which may be arise due to pets, animals, or children present in the perimeter of the property 201. However, the motion sensor 203, 205, 207, and 209 and the predetermined weight is not limited to above example and any other type of motion sensor having similar or different predetermined weight criteria is well within the scope of the present disclosure.

In an embodiment of the present disclosure, if a time period of any activity detected by the motion sensors 203, 205, 207, and 209 surpasses a predetermined time period, a plurality of laser curtains present all around the property 201 is activated and an alert is also transmitted to the owner of the house. The alert may comprise a text message, and application notification, or live streaming of cameras installed on the property 201. In one non-limiting embodiment of the present disclosure, the predetermined time period may be 5-15 seconds. However, the predetermined time period is not limited to above example and any other predetermined time period is well within the scope of present disclosure.

Figure 3A:
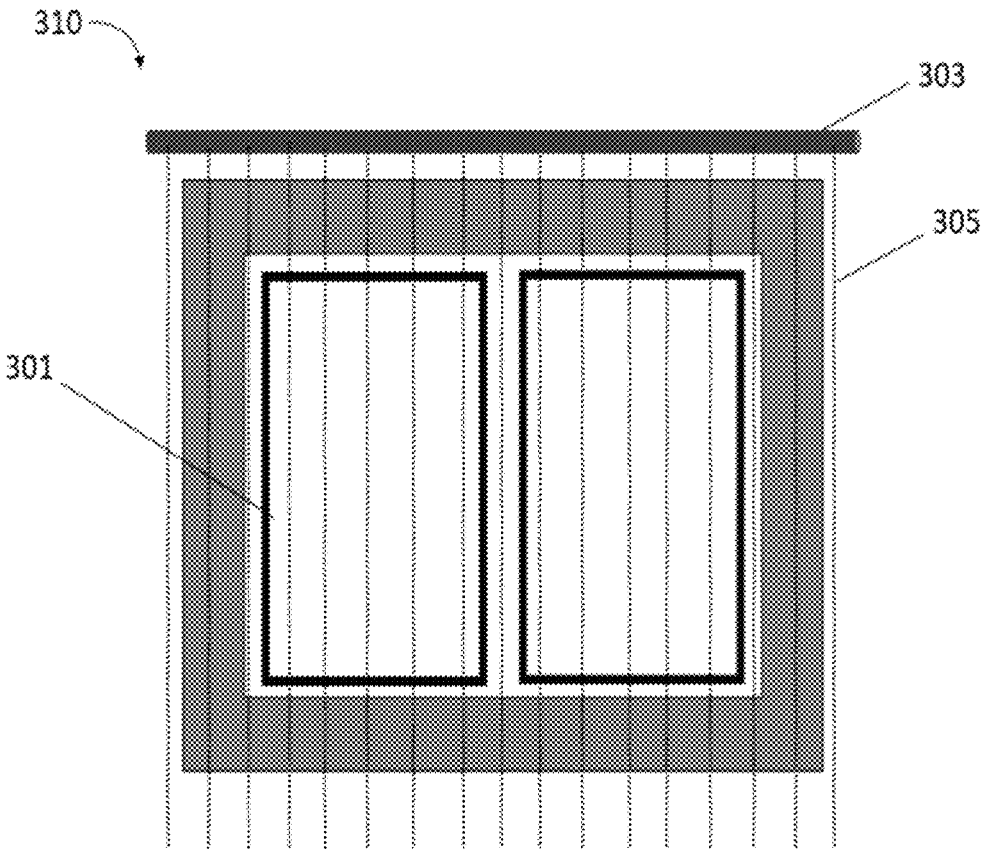
FIG. 3(*a*) illustrates an exemplary implementation of a laser curtain on a window of a house, in accordance with some embodiments of the present disclosure.
Figure 3B:
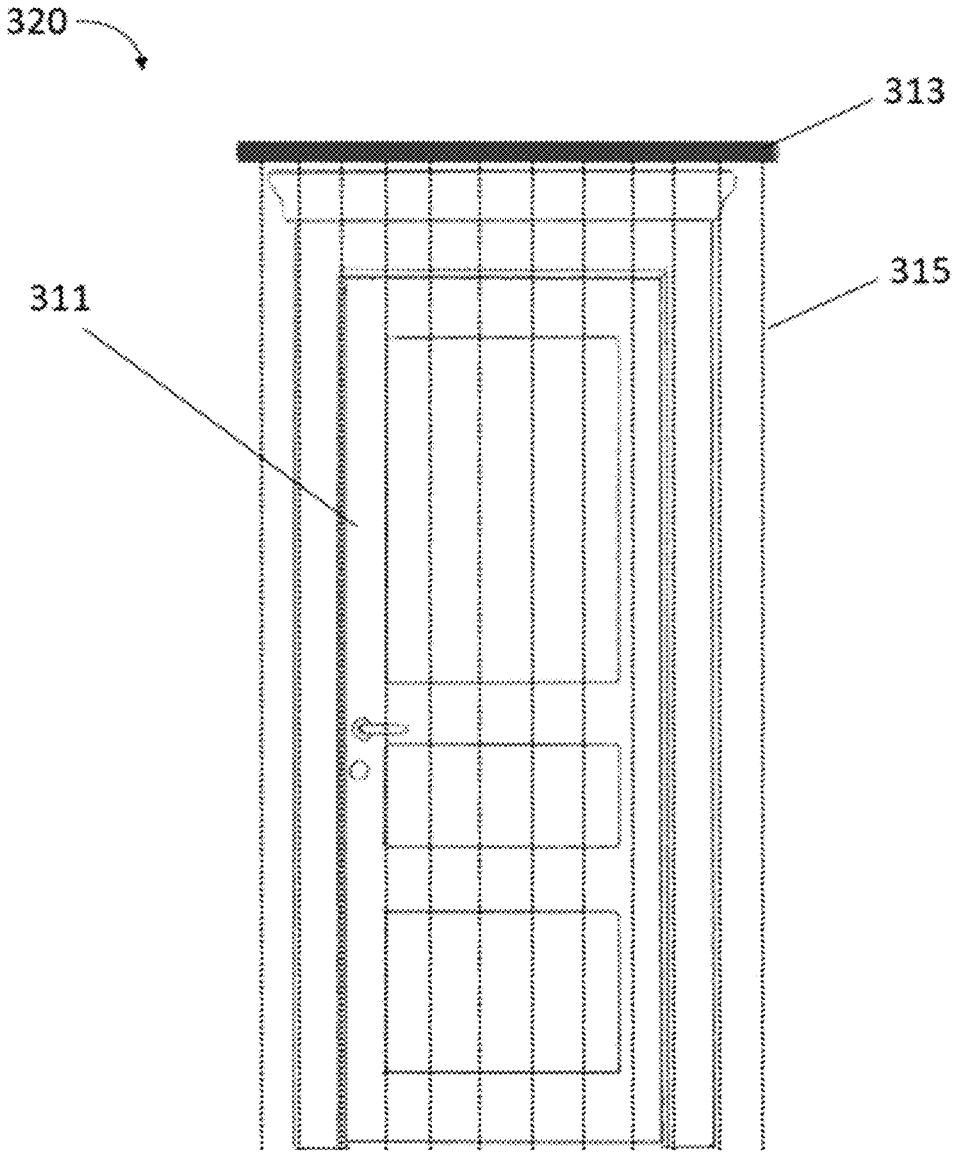

FIG. 3(*a*) illustrates an exemplary implementation 310 of a laser curtain on a window of a house, in accordance with some embodiments of the present disclosure.

In an embodiment of the present disclosure, the implementation 310 may comprise a circular rod 303 placed or fixed above the window 301. The circular rod 303 may be capable of accommodating a plurality of laser units. The laser units may be placed at an equal distance from each other. The laser units may be configured to emit a plurality of laser beams 305. The laser beams 305 may form laser curtain in front of the window 301. The laser curtain act as a protective shield and is capable of detecting an intruder.

In one non-limiting embodiment of the present disclosure, the laser curtain may be activated only if any lurking activity detected by the motion sensors surpasses the predetermined time period, as discussed in above embodiments. The laser units may be configured to continuously measure a height. Any change in height measured by the laser units may be treated as disruption of laser curtain. The disruption of the laser curtain may initiate an audio-visual alert to the owner of the house as well as people present outside the house.

FIG. 3(*b*) illustrates an exemplary implementation 320 of a laser curtain on an entrance door of a house, in accordance with some embodiments of the present disclosure.

In an embodiment of the present disclosure, the implementation 320 may comprise a circular rod 313 placed or fixed above the door 311. The circular rod 313 may be capable of accommodating a plurality of laser units. The laser units may be placed at an equal distance from each other. The laser units may be configured to emit a plurality of laser beams 315. The laser beams 315 may form laser curtain in front of the door 311 and may detect an intruder activity if the laser curtain is disrupted in any manner.

In one non-limiting embodiment of the present disclosure, the laser curtain may be activated only if any lurking activity detected by the motion sensors surpasses the predetermined time period, as discussed in above embodiments. The laser units present in the circular rod 313 may be configured to continuously measure a height. Any change in height measured by the laser units may be treated as disruption of laser curtain. The disruption of the laser curtain may initiate an audio-visual alert to notify about the intruder to the owner of the house and people present outside the house.

The implementation of the laser curtain is not limited to above examples of doors and windows as shown in FIG. 3(*a*) and FIG. 3(*b*). In one non-limiting embodiment of the present disclosure, a plurality of laser curtain may be present all around the property to form a line of defence (shield or dome) around the property. If any one of the laser curtains is disrupted in any manner, an audio-visual alert is generated to notify about the intruder to the owner of the house and people present outside the house.

Figure 4A:
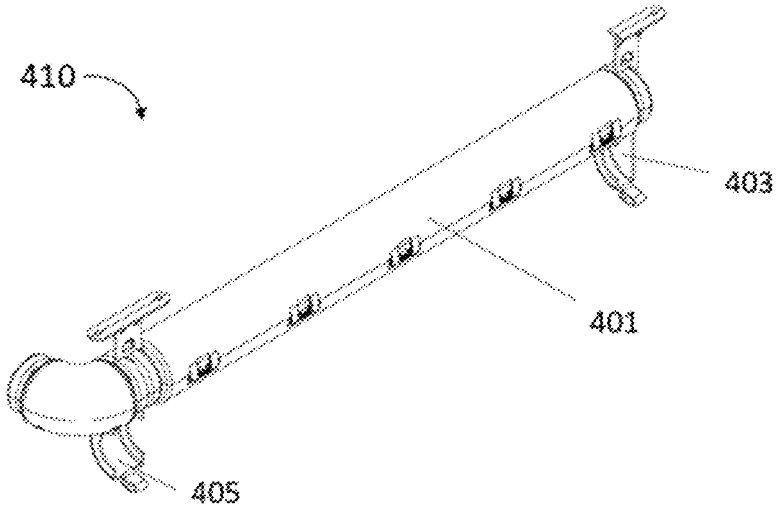
FIG. 4(*a*) illustrates an exemplary laser curtain rod, in accordance with some embodiments of the present disclosure.
Figure 4B:
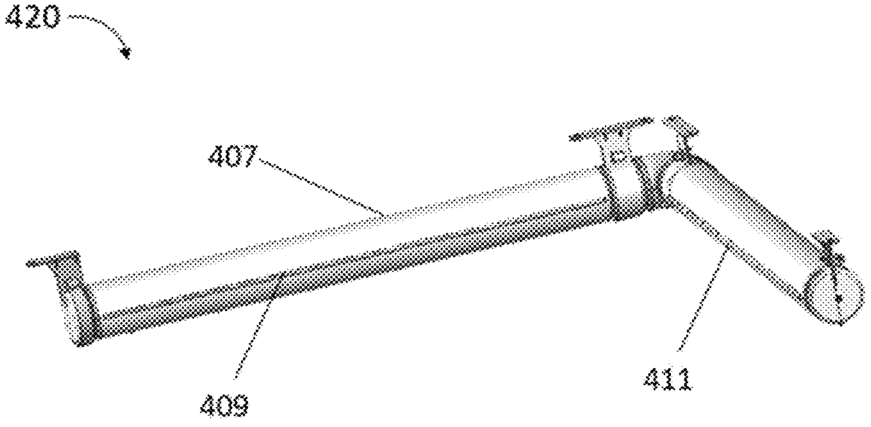

FIG. 4(*a*) illustrates an exemplary laser curtain rod 410, in accordance with some embodiments of the present disclosure.

In an embodiment of the present disclosure, the laser curtain rod 410 may comprise hollow cylindrical pipe 401 comprising a number of openings 403, 405 for installing a number of laser units. The laser units may be embedded within the laser curtain rod 410 and can be adjusted by rotating the cylindrical pipe 401. The laser curtain rod 410 may be hinged on the top of the wall, doors, and windows using the brackets. When the laser curtain rod 410 is activated, a plurality of laser beams is emitted by the laser units as shown in FIG. 3(*a*) and FIG. 3(*b*).

FIG. 4(*b*) illustrates an exemplary laser curtain rod 420, in accordance with some embodiments of the present disclosure.

In an embodiment of the present disclosure, the laser curtain rod 420 may comprise a hollow L shape circular pipe 407. The laser curtain rod 420 may comprise a few brackets for attaching the laser curtain rod 420 to the wall, doors, and windows. The laser curtain rod 420 may comprise a plurality of laser units 409 and 411 embedded into the circular pipe 407 and the plurality of laser units 409 and 411 may be configured to emit a plurality of laser beams through the openings present in the laser curtain rod 420.

In one non-limiting embodiment of the present disclosure, the laser curtain rod 410 and 420 (as shown in FIG. 4(*a*) and FIG. 4(*b*)) may be made up of any material known to person skilled in the art.

Figure 5:
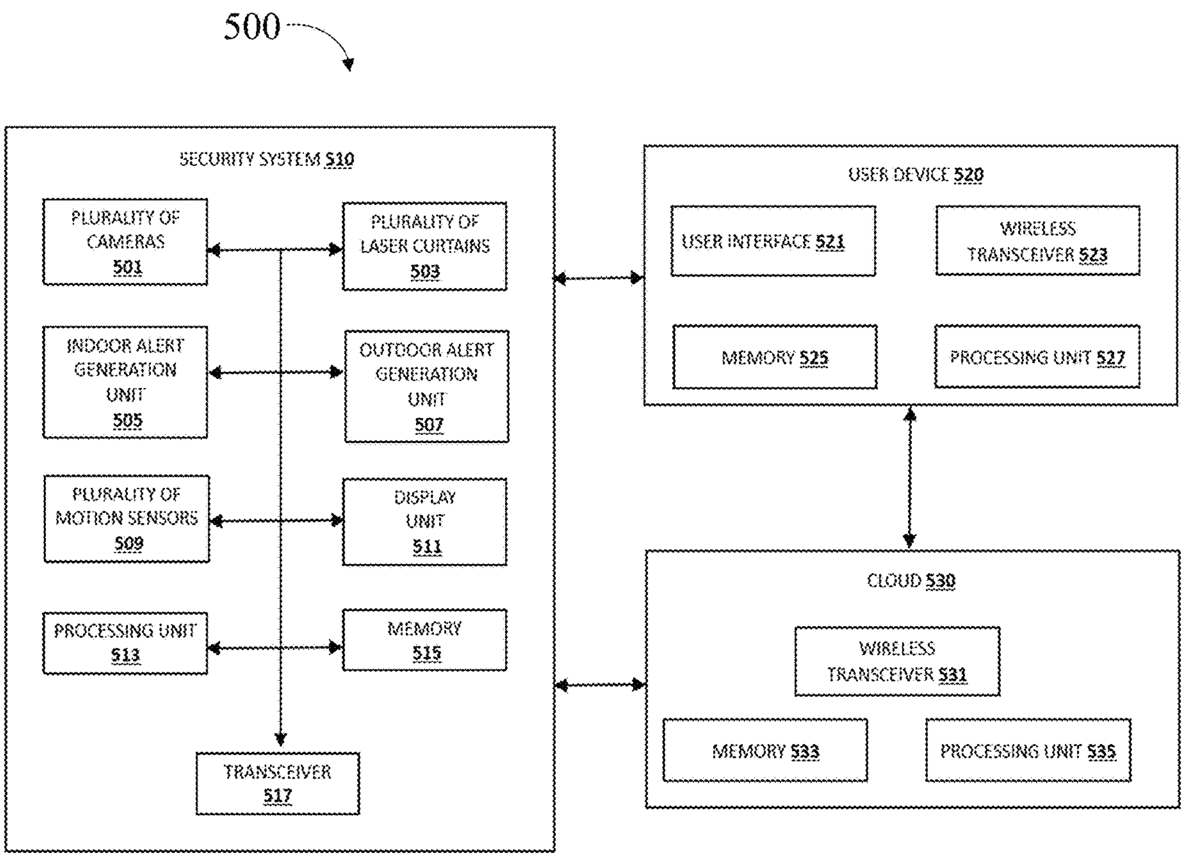
FIG. 5 shows a block diagram of a system for monitoring and reporting a security breach of a property, in accordance with some embodiments of the present disclosure.

FIG. 5 shows a block diagram of a system 500 for monitoring and reporting a security breach of a property, in accordance with some embodiments of the present disclosure.

In an embodiment of the present disclosure, the system 500 may comprise a security system 510, a user device 520, and a cloud 530 in communication with each other. The security system 510 may comprise a plurality of cameras 501, a plurality of laser curtains 503, at least two alert generation unit comprising an indoor alert generation unit 505 and an outdoor alert generation unit 507, a plurality of motion sensors 509, a display unit 511, a processing unit 513, a memory 515 and a transceiver 517 communicatively coupled with each other.

In an embodiment of the present disclosure, the user device 520 may comprise a user interface 521, a wireless transceiver 523, a memory, 525, and a processing unit 527 in communication with each other. The user interface 521 may also comprise a display unit. The user device 520 may be a mobile phone, a desktop computer, a laptop, a tablet computer, or any other computing device known to a person skilled in the art.

In an embodiment of the present disclosure, the cloud 530 may comprise a wireless transceiver 531, a memory 533, and a processing unit 535 in communication with each other. The cloud 530 may be present locally or remotely to the security system 510. In one non-limiting embodiment of the present disclosure, the security system 510 may transmit all the necessary data to the user device 520 via cloud 530. In another non-limiting embodiment of the present disclosure, the security system 510 may transmit all the necessary data directly to the user device 520.

In an embodiment of the present disclosure, a plurality of cameras 501 may be installed all around the property and the plurality of cameras 501 may be configured to capture a video from different viewpoints of the property for video surveillance. The plurality of motion sensors 509 are placed outside of the property in such a manner that a maximum coverage is provided at the perimeter of the property, as shown in FIG. 2.

The plurality of motion sensors 509 may comprise pet immune motion sensors capable of detecting any activity of the entity having a predetermined weight. In an embodiment of the present disclosure, the pet immune sensors may only detect activity of the entity which is over 45 kg weight. Thus, the pet immune motion sensors facilitate elimination of false alarm and unwanted alerts that may occur due to pets, animal, or children present near the property. However, the motion sensor is not limited to above example and any other motion sensor capable of identifying pets, animal, or children is well within the scope of present disclosure.

In an embodiment of the present disclosure, the plurality of motion sensors 509 may be configured to detect at least one activity using at least one motion sensor of the plurality of motion sensors 509. The at least one activity may comprise a lurking activity, a skulking activity, or a loitering activity outside the property. The activity may be associated with an entity having a predetermined weight.

The processing unit 513 may be configured to monitor a time period of the at least one activity detected by the motion sensors 509, and determine whether the time period of the at least one activity surpasses a predetermined time period. If the time period of the at least one activity surpasses the predetermined time period, the processing unit 509 may be configured to activate the plurality of laser curtains 503 placed on the property, and transmit an alert to an owner of the property.

In one non-limiting embodiment of the present disclosure, the plurality of laser curtains 503 may be placed over the possible entrance points such as doors and windows. In another non-limiting embodiment of the present disclosure, the plurality of laser curtains 503 may be placed all around the property to form a dome or protection shield. The plurality of laser curtains comprises a circular rod structure for accommodating the plurality of laser units.

Each laser curtain may comprise a plurality of laser units which are configured to emit a plurality of laser beams, when the plurality of laser curtains 503 are activated. Further, to transmit the alert to the owner of the property, the processing unit 513 may be configured to provide a live streaming of plurality of cameras placed around the property. In one non-limiting embodiment of the present disclosure, the alert may also comprise a text message or an application notification on the user device 520 of the owner, which indicates that the barrier around the property has been penetrated.

In an embodiment of the present disclosure, the display unit 511 may be installed at the door of the house or the property and the display unit 511 may be configured to display the alert on a screen of the display unit. The alert may comprise a notification indicating that the barrier around the property has been penetrated. The display unit 511 may also provide monitor and control function such as arming and disarming of the security system 510. The owner may user the display unit 511 to turn ON/OFF the security system. In one non-limiting embodiment of the present disclosure, the owner may turn ON/OFF the security system through the user device 520.

In an embodiment of the present disclosure, the display unit 511 may be configured to display the live video being captured from the plurality of cameras 501. The owner may verify the penetration of the barrier and may disarm the security system 510. The disarming of the security system 510 may comprise deactivating the plurality of laser curtains 503, thereby reducing the chances of false alarms and unwanted alerts.

In an embodiment of the present disclosure, the live video recording of the plurality of cameras 501 may be transmitted to the cloud 530 via the transceiver 517 and the processing unit 535 of the cloud 530 may be configured to store the live streaming in the memory 533. In one non-limiting embodiment of the present disclosure, the live streaming of plurality of cameras may be transmitted to security personnel, or police, or the owner through the cloud 530.

In an embodiment of the present disclosure, the processing unit 513 may be configured to determine whether at least one laser curtain of the plurality of laser curtains 503 is disrupted after the activation of plurality of laser curtains 503. To determine whether the at least one laser curtain of the plurality of laser curtains 503 is disrupted, the processing unit 513 may be configured to monitor a height measured by each of the plurality of laser units, detect a change of height by comparing the height measured by each of the plurality of laser units with a respective initial height measurement, and determine a disruption of the at least one laser curtain if the change of height is detected. In one non-limiting embodiment of the present disclosure, the initial height measurement may be taken at the time of installation of the plurality of laser curtains 503 around the property.

If at least one laser curtain of the plurality of laser curtains is disrupted, the processing unit 513 may be configured to generate an audio-visual alert to notify about the security breach to one or more people present inside and outside of the property. The audio-visual alert may be generated by the indoor alert generation unit 505 and the outdoor alert generation unit 507. Each of the indoor alert generation unit 505 and the outdoor alert generation unit 507 comprise an audio generation unit and a light emission unit.

The audio generation unit may be configured to generate an audio alarm and a light emission unit may be configured to generate continuous flash of light. The indoor alert generation unit 505 may notify about the intruder activity to the owner present inside the house or the property. The outdoor alert generation unit 507 may be configured to notify the people present outside of the house or the property.

Thus, the system 500 for monitoring and reporting a security breach of the property facilitates a fast yet effective response and deterrent to any perimeter security breach. The security breach detection, using the motion sensors 509 and the plurality of laser curtains 503, protects and alerts homeowners from any potential intruders while minimizing false alarms and unwanted alerts.

The processing unit 513, 527, 535 may include, but are not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. The system 500 may comprise interfaces including a variety of software and hardware interfaces, for example, a web interface, a graphical user interface, an input device-output device (I/O) interface, an access network interface, and the like.

The memory 515, 525, 533 may be communicatively coupled to the at least one processor. The memory 515, 525, 533 may comprise various data and one or more instructions. The memory 515, 525, 533 may comprise various software modules/codes such as, but not limited to, Bluetooth and Wi-Fi drivers. The memory 515, 525, 533 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

Figure 6:
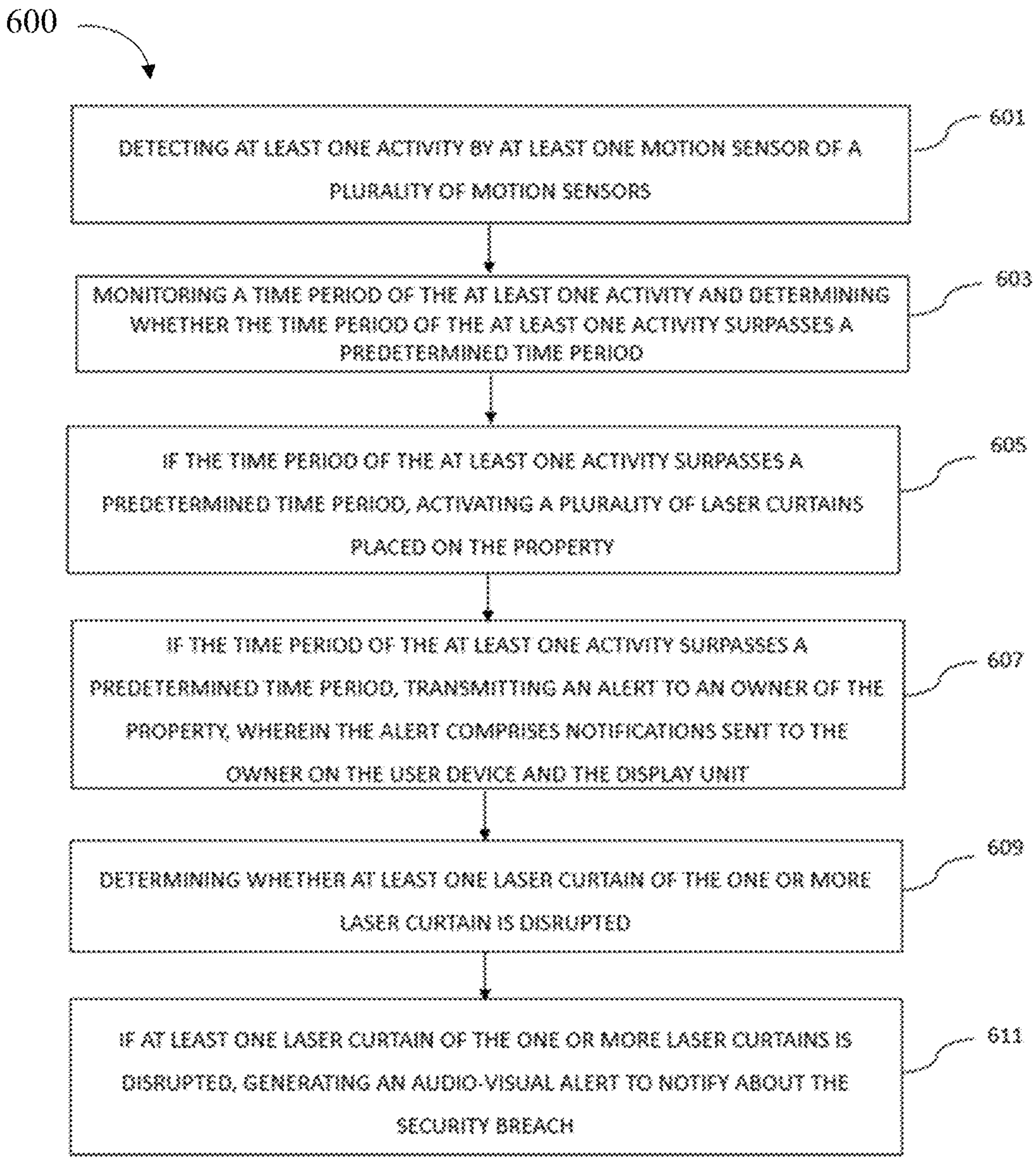
FIG. 6 depicts a flowchart illustrating an exemplary method of monitoring and reporting a security breach of a property, in accordance with some embodiments of the present disclosure.

FIG. 6 depicts a flowchart illustrating an exemplary method 600 of monitoring and reporting a security breach of a property, in accordance with some embodiments of the present disclosure.

At block 601, the method 600 describes detecting at least one activity by at least one motion sensor of a plurality of motion sensors that are placed outside the property. The detection of the at least one activity comprises detecting a lurking activity, a skulking activity, or a loitering activity outside the property by the at least one motion sensor.

In an embodiment of the present disclosure, the plurality of motion sensors includes at least one pet immune motion sensor. The at least one pet immune motion sensor detects the at least one activity of an entity having a predetermined weight. However, the motion sensor is not limited to above example and any other sensor capable of detecting any activity of the entity having the predetermined weight is well within the scope of the present disclosure.

At block 603, the method 600 describes monitoring a time period of the at least one activity detected by the at least one motion sensor and determining whether the time period of the at least one activity surpasses a predetermined time period. At block 605, if the time period of the at least one activity surpasses the predetermined time period, a plurality of laser curtains is activated. Each laser curtain may comprise a plurality of laser units for emitting a plurality of laser beams. The plurality of laser curtains may be situated at the possible entrance points such as doors and windows. In one non-limiting embodiment, the plurality of laser curtains may be present all around the property.

At block 607, if the time period of the at least one activity surpasses the predetermined time period, an alert is transmitted to the owner of the property. The alert may include a text message or an application notification on a device of the owner. The transmission of the alert may further comprise providing a live streaming of plurality of cameras placed around the property on the device of the owner.

In an embodiment of the present disclosure, the method 600 further comprises displaying the alert via a display unit. The alert comprises a notification indicating that the barrier around the property has been penetrated, and the display unit is used for turning ON/OFF the security system. Thus, the display unit facilitates the owner with monitor and control functionality as the owner may disarm the security system by verifying through the live streaming videos, thereby reducing the chances of unnecessary false alarm and unwanted alert.

At block 609, the method 600 describes determining whether at least one laser curtain of the plurality of laser curtains is disrupted. The determination of whether the at least one laser curtain of the plurality of laser curtains is disrupted comprises monitoring a height measured by each of the plurality of laser units, detecting a change of height by comparing the height measured by each of the plurality of laser units with a respective initial height measurement, and determining a disruption of the at least one laser curtain if the change of height is detected. The initial height measurement may be recorded at the time of installation of plurality of laser curtains.

At block 611, the method 600 discloses if the at least one laser curtain of the plurality of laser curtains is disrupted, generating an audio-visual alert to notify about the security breach to one or more people present inside and outside of the property. The audio-visual alert comprises an audio alarm and a continuous flash of light. The audio-visual alert may be generated using the two alert generation units which are present both inside and outside of the property. The indoor alert generation unit may alert the owner of the property about the intruder or security breach and the outdoor alert generation unit may alert the people outside about the security breach.

Thus, the method 600 facilitates a fast yet effective response and deterrent to any perimeter security breach. The security breach detection, using the motion sensors and the plurality of laser curtains, protects, and alerts homeowners from any potential intruders while minimizing false alarms and unwanted alerts.

In another non-limiting embodiment of the present disclosure, the steps of method 600 may be performed in an order different from the order described above.

In a non-limiting embodiment of the present disclosure, one or more non-transitory computer-readable media may be utilized for implementing the embodiments consistent with the present disclosure. A computer-readable media refers to any type of physical memory (such as the memory 515, 525, 533) on which information or data readable by a processor may be stored. Thus, a computer-readable media may store one or more instructions for execution by the at least one processor, including instructions for causing the at least one processor to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the appended claims.

What is claimed is:

1. A method of monitoring and reporting a security breach of a property, the method comprising:

detecting at least one activity by at least one motion sensor of a plurality of motion sensors, wherein the plurality of motion sensors is placed outside the property;

monitoring a time period of the at least one activity and determining whether the time period of the at least one activity surpasses a predetermined time period;

if the time period of the at least one activity surpasses the predetermined time period:

activating a plurality of laser curtains placed on the property, and transmitting an alert to an owner of the property;

determining whether at least one laser curtain of the plurality of laser curtains is disrupted; and if the at least one laser curtain of the plurality of laser curtains is disrupted, generating an audio-visual alert to notify about the security breach to one or more people present inside and outside of the property.

2. The method of claim 1, wherein the audio-visual alert comprises an audio alarm and a continuous flash of light.

3. The method of claim 1, wherein detecting the at least one activity comprises detecting a lurking activity, a skulking activity, or a loitering activity outside the property by the at least one motion sensor.

4. The method of claim 1, wherein the plurality of motion sensors includes at least one pet immune motion sensor, and wherein the at least one pet immune motion sensor detects the at least one activity of an entity having a predetermined weight.

5. The method of claim 1, wherein each laser curtain comprises a plurality of laser units for emitting a plurality of laser beams.

6. The method of claim 5, wherein determining whether the at least one laser curtain of the plurality of laser curtains is disrupted comprises:

monitoring a height measured by each of the plurality of laser units;

detecting a change of height by comparing the height measured by each of the plurality of laser units with a respective initial height measurement; and determining a disruption of the at least one laser curtain if the change of height is detected.

7. The method of claim 1, wherein transmitting the alert to the owner of the property comprises:

providing a live streaming of plurality of cameras placed around the property.

8. The method of claim 1, wherein the alert includes a text message or an application notification on a device of the owner, wherein the method further comprises:

displaying the alert via a display unit, wherein the alert comprises a notification indicating that the barrier around the property has been penetrated, and wherein the display unit is used for turning ON/OFF the security system.

9. A system for monitoring and reporting a security breach of a property, the system comprising:

a plurality of cameras;

a plurality of laser curtains;

at least two alert generation unit, wherein each alert generation unit includes an audio generation unit and a light emission unit, and wherein at least one alert generation unit is placed inside the property and at least one alert generation unit is placed outside the property;

a plurality of motion sensors placed outside the property and configured to:

detect at least one activity using at least one motion sensor of the plurality of motion sensors;

a memory comprising one or more instruction; and a processing unit in communication with the plurality of cameras, the plurality of laser curtains, the at least two alert generation unit, the plurality of motion sensors, and memory, wherein the processing unit is configured to:

monitor a time period of the at least one activity and determine whether the time period of the at least one activity surpasses a predetermined time period;

if the time period of the at least one activity surpasses the predetermined time period, the processing unit is configured to:

activate the plurality of laser curtains placed on the property, and transmit an alert to an owner of the property;

determine whether at least one laser curtain of the plurality of laser curtains is disrupted; and generate an audio-visual alert to notify about the security breach to one or more people present inside and outside of the property, if at least one laser curtain of the plurality of laser curtains is disrupted.

10. The system of claim 9, wherein to generate the audio-visual alert, the processing unit is configured to:

generate, via the at least two alert generation unit, an audio alarm; and emit, via the at least two alert generation unit, a continuous flash of light.

11. The system of claim 9, wherein to detect the at least one activity, the at least one motion sensor of the plurality of motion sensors is configured to detect a lurking activity, a skulking activity, or a loitering activity outside the property.

12. The system of claim 9, wherein the plurality of motion sensors includes at least one pet immune motion sensor, and wherein the at least one pet immune motion sensor is configured to detect the at least one activity of an entity having a predetermined weight.

13. The system of claim 9, wherein each laser curtain comprises:

a plurality of laser units configured to emit a plurality of laser beams.

14. The system of claim 13, wherein to determine whether the at least one laser curtain of the plurality of laser curtains is disrupted, the processing unit is configured to:

monitor a height measured by each of the plurality of laser units;

detect a change of height by comparing the height measured by each of the plurality of laser units with a respective initial height measurement; and determine a disruption of the at least one laser curtain if the change of height is detected.

15. The system of claim 9, wherein to transmit the alert to the owner of the property, the processing unit is configured to:

provide a live streaming of the plurality cameras placed around the property.

16. The system of claim 15, wherein the processing unit is configured to store the live streaming of the plurality of cameras in the memory.

17. The system of claim 9, wherein to transmit the alert, the processing unit is configured to transmit a text message or an application notification on a device of the owner, wherein the system further comprises a display unit in communication with the processing unit and configured to:

display the alert on a screen of the display unit, wherein the alert comprises a notification indicating that the barrier around the property has been penetrated, and turn ON/OFF the security system.

18. The system of claim 13, wherein the plurality of laser curtains comprises a circular rod structure for accommodating the plurality of laser units.

19. A non-transitory computer-readable medium having computer-readable instructions that when executed by a processor causes the processor to perform operations of:

detecting at least one activity by at least one motion sensor of a plurality of motion sensors, wherein the plurality of motion sensors is placed outside the property;

monitoring a time period of the at least one activity and determining whether the time period of the at least one activity surpasses a predetermined time period;

if the time period of the at least one activity surpasses the predetermined time period:

activating a plurality of laser curtains placed on the property, and transmitting an alert to an owner of the property;

determining whether at least one laser curtain of the plurality of laser curtains is disrupted; and if at least one laser curtain of the plurality of laser curtains is disrupted, generating an audio-visual alert to notify about the security breach to one or more people present inside and outside of the property.

* * * * *